Sept. 17, 1963 J. E. SHIPPER 3,103,944
EMERGENCY STOPPER
Filed Jan. 18, 1961
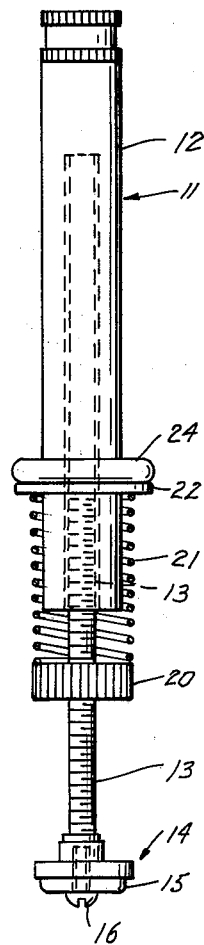
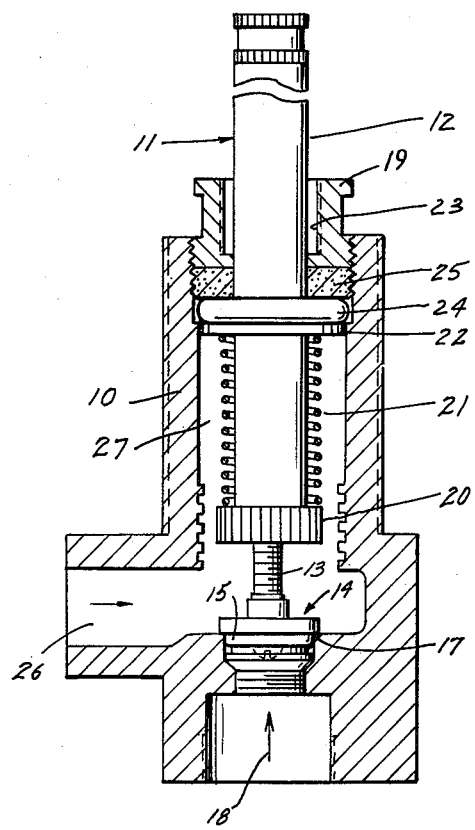
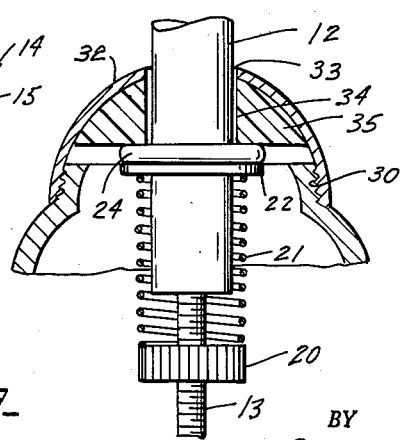
INVENTOR.
JOHN E. SHIPPER
BY
OSTROLENK, FABER, GERB & SOFFEN
ATTORNEYS

United States Patent Office 3,103,944
Patented Sept. 17, 1963

3,103,944
EMERGENCY STOPPER
John E. Shipper, Brooklyn, N.Y., assignor to Crest Manufacturing Company, Inc., Long Island City, N.Y., a corporation of New York
Filed Jan. 18, 1961, Ser. No. 83,556
3 Claims. (Cl. 137—315)

This invention generally relates to plumbing fixtures and more particularly to an adjustable emergency stopper to substitute for the usual valve and stem mechanism of different size faucets or valve housings when the valve mechanism thereof has been removed for replacement or repair.

In the prior art there has been provided emergency stopper devices that are adapted to be inserted into bathroom or sink faucets when the faulty valve mechanism of the faucet is removed awaiting replacement of the parts or repair. Such devices are adapted to perform the very useful function of sealing the faucet against the leakage or escape of water without the need for turning off the main supply of water for the entire repair operation and thereby inconveniencing the user.

In most instances only one of the hot or cold water valve sides in the usual double faucet is in need of repair and it is therefore desired that such emergency stopper devices be capable of properly sealing only that one side of the faucet that is in need of repair without interfering with the normal use of the other side nor allowing any water leakage when the other side is being used.

However, due to the fact that the dimensions of the different faucet mechanisms vary greatly depending on style and usage, it is also necessary that such emergency stopper devices be adjustable to fit the varying dimensions of different faucets in order to be of any widespread utility and this requirement has been heretofore found to be generally incompatible with the design of stoppers that are capable of individually sealing only one side of the faucet while permitting use of the other side.

More specifically considering this drawback of prior art devices, according to one known emergency stopper device of the prior art, there is provided an elongated threaded stem member that is generally the equivalent of the usual valve stem and having a stopper valve head at one end thereof and a compression spring adjustably supported along the length of the stem. When this stopper is substituted in the faucet for the faulty valve stem mechanism, the bonnet or gland nut of the faucet serves to compress the spring carried by the elongated stem and thereby urges the valve head against the valve seat in the faucet cutting off the flow of water through that valve. However, due to the fact that the length of the threaded stem portion must be sufficiently long to fit a number of different faucets and the diameter thereof small enough to fit within a variety of differenet faucets, the region at which the stem projects through the usual faucet bonnet gland nut and packing at this area cannot be sealed against the escape or leakage of water when the other side of the faucet is being operated and the water from inside the faucet may travel along the channel between the helical threads on the stem and escape through the bonnet area. For this reason, known stoppers of this prior art type do not permit the opposite side of the faucet to be used, and the user must suffer the inconvenience of having the complete faucet not usable while awaiting repair of one side thereof.

According to the present invention there is provided an emergency stopper mechanism that provides a dual sealing function; the first being at the valve seat at that one side of the faucet where the usual valve and stem have been removed and the second seal being provided at the bonnet area of that side of the faucet. By providing this dual sealing function, the stopper does not in any way interfere with the proper functioning of the other side of the faucet which may thereby be used as usual without any leakage of water through the bonnet area as is common in prior art devices. Very generally, this improved function is brought about by substituting for the usual threaded stem of the prior art stopper, a combination sleeve and stem mechanism together with an O-ring seal that is adapted to mate with the sleeve and with the faucet walls in the bonnet area to provide a second water tight seal at the faucet bonnet region. Both the main stopper seal at the valve head and the second seal at the bonnet area are both commonly actuated by a single compression spring to provide an inexpensive and effective stopper mechanism of greater utility than known prior art devices.

It is accordingly a primary object of the invention to provide an adjustable stopper that may be employed with a variety of different size faucets for sealing against the escape of water when the valve mechanism has been removed awaiting replacement of parts or repair.

A further object of the invention is to provide such a stopper for double hot and cold water faucets and sinks that is capable of sealing the side in need of repair while permitting normal dispensing operation of the other side of the faucet.

Other objects and many additional advantages will be more readily understood by those skilled in the art after a detailed consideration of the following specification taken with the accompanying drawing wherein:

FIGURE 1 is a side elevational view, partly in section, illustrating a portion of a conventional faucet having a stopper according to the present invention inserted therein, FIGURE 2 is a view similar to FIGURE 1 and illustrating details of a preferred stopper mechanism alone, and FIGURE 3 is a sectional view of a portion of a differently constructed faucet mechanism having a different bonnet or gland nut and packing construction and employing the stopper device of the present invention for effecting a water tight seal at the bonnet region.

Referring now to the drawings, there is shown in FIGURE 1 one half of a typical faucet body 10, shown partially in cross section, and incorporating an adjustable emergency stopper according to the invention. The stopper generally comprises a two part vertically disposed valve stem 11 having an elongated upper sleeve portion 12 that is provided with an internally threaded bore to axially receive a lower threaded rod portion 13. FIGURE 2 illustrates this two part stem in enlarged view.

At the base of the rod portion 13 is fastened a valve head 14 that includes a conventional annular faucet washer 15 centrally fastened to the rod 13 by means of a screw 16 or the like. The valve head portion 14 is adapted to bear against the valve seat portion 17 within the faucet thereby to seal against the flow of water upwardly as shown in the direction indicated by the arrow 18.

As is believed evident from this construction, the length of the valve stem 11 is adjustable by threading the rod 13 further into and out of the sleeve portion 12 for enabling the stopper to be inserted into faucets of different length in such manner that the valve head 14 bears against the valve seat 17 and the upper end of the sleeve portion 12 projects through the opening 23 in the conventional faucet bonnet or gland nut 19.

Carried on the threaded rod 13 is a threaded lock nut 20 which when threaded upwardly along the rod 13 until abutting the sleeve 12 serves as a stop preventing further downward positioning of the sleeve over the rod 13. The upper surface of the lock nut 20 also serves as the base for supporting a compression spring 21, which spring functions to urge the valve head 14 against the valve seat 17 as will be apparent hereafter.

The upper end of the compression spring 21 bears against an annular friction ring or washer 22 disposed about the sleeve 12, thereby urging the friction ring 22 upwardly along the sleeve portion 12. Above the friction ring 22 and tightly about the sleeve portion 12 is provided a deformable O-ring 24, and above the O-ring 24 is provided a suitable faucet packing material 25 that is rightly packed beneath the base of the faucet bonnet or gland nut 19. Thus as the compression spring 21 urges the friction ring upwardly along the sleeve 12, the O-ring 24 and packing 25 are sandwiched between the gland nut 19 and friction ring 22 thereby deforming the O-ring 24 tightly against both the inner wall of the faucet neck portion and against the smooth outer surface of the sleeve 12.

As will be recalled from the brief introductory remarks in this specification, one of the serious drawbacks in the use of prior art emergency stoppers is the fact that they do not provide a good water tight seal in the region about the bonnet or gland nut 19 and consequently, water entering the common conduit 26 leading from the other side of the faucet (not shown) may pass from conduit 26 and upwardly in the region 27 between the valve stem and the faucet walls and may leak or escape through the bonnet area. Such water would be present whenever the other side of the faucet were operated and hence with the use of prior art stoppers neither side of the faucet can be used without water leakage.

However, according to the present invention, the stopper provides two water tight seals, the first being at the valve head 14 and valve seat 17 to prevent flow of the water from one side of the faucet where the usual valve mechanism has been replaced by the stopper, and the second water tight seal being provided below the bonnet or gland nut 19 at the region where the O-ring is deformed to seal both the walls of the neck of the faucet and the smooth surface about the sleeve 12. All of these seals are simultaneously provided by the action of the compression spring 21 which urges the valve head 14 downwardly against its seat 17 and deforms the O-ring radially against the surface of the sleeve portion 12 and the inner walls of the faucet neck.

It is also important to note that the addition of such an O-ring in the constructions known in the prior art would not suffice to produce a water tight seal in the bonnet area due to the fact that the valve stems in the known prior art stopper devices are threaded in the region near the faucet bonnet and are not provided with a smoothly surfaced sleeve as in the present invention whereby water may easily leak through the threaded region about the stem to escape through the bonnet.

FIGURE 3 illustrates a portion of a second type of faucet bonnet construction and the manner in which the O-ring 24 serves to provide a leakproof seal at this region. As shown, the upper portion of the faucet 30 is shaped and threaded at 31 to receive a hemispherical shaped bonnet member 32. In this construction it is observed that a substantial gap 33 may exist between the sleeve portion 12 and the bore 34 of the packing. Ordinarily, according to prior art constructions, such a gap 33 would permit extensive leakage of water. However, by the use of a spring pressed O-ring 24 and a smooth surface cylindrical sleeve 12, as taught by the present invention, such leakage is precluded.

Thus according to the present invention there is provided what may be termed a universal adjustable stopper device that may be used with a wide variety of different faucet and sink constructions for sealing against the leakage or escape of water when the valve mechanism has been removed awaiting replacement of parts or repair, which stopper device is further characterized in providing a plurality of water tight seals in the faucet that enable the other hot or cold water portions of the faucet to be normally operated and used as before without leakage or escape of water. Although but one preferred embodiment of the invention has been illustrated and described, it is believed evident that many changes and variations may be made without departing from the spirit and scope of the invention. Accordingly, this invention should be considered as being limited only by the following claims.

What is claimed is:

1. An adjustable emergency stopper for watertight sealing of a valve housing and having a dual sealing means for sealing the valve seat of the valve housing and the bonnet region of the valve housing and stopper, said stopper comprising an adjustable length stem member for adapting to different valve housings, said stem member having an upper portion with a smooth outer surface, a lower portion of the stem supporting a valve head, an O-ring tightly engaging the smooth surface of the upper portion of the stem, and a compression spring on said stem member, a locking means mounted on said adjustable length stem member, said locking means providing support for said compression spring, said spring being intermediate said locking means and said O-ring, whereby upon insertion in a valve housing said spring simultaneously urges said valve head against a valve seat and positions said O-ring for sealing said stem.

2. In the stopper of claim 1, said lower portion of said stem member being externally threaded and said upper portion being internally threaded to receive the lower portion, and said locking means comprising a lock nut threaded for travel on said lower portion.

3. In a device of the class described, a pair of elongated elements, a seal slidably carried by one of said elements and extending peripherally therearound and outwardly therefrom for a predetermined distance, a valve head carried by the other of said elements and resilient means intermediate said seal and said other of said elements, means for effecting axial adjustment of said elements with respect to each other wherein said other element comprises a threaded rod carried within a threaded bore of said one element, said seal and valve head being disposed to effect sealing pressure in opposite directions, said resilient means comprising a compression spring, a rotative nut carried on said other element, said compression spring encompassing portions of said elements and being compressively stressed between said nut and said seal, said nut being engageable with said one element to lock said elements in adjusted position.

References Cited in the file of this patent

UNITED STATES PATENTS

| | | |
|---|---|---|
| 400,944 | Powell | Apr. 9, 1889 |
| 1,555,996 | Leverich | Oct. 6, 1925 |
| 1,597,254 | Vogel | Aug. 24, 1926 |
| 2,980,390 | Anderson | Apr. 18, 1961 |